United States Patent
Dittrich

(10) Patent No.: US 10,230,251 B2
(45) Date of Patent: Mar. 12, 2019

(54) STATION FOR CHARGING AND HOLDING TELECOMMUNICATIONS DEVICES

(71) Applicant: Klemens Dittrich, Wuppertal (DE)

(72) Inventor: Andreas Dittrich, Köln (DE)

(73) Assignee: Klemens Dittrich, Wuppertal (DE)

( * ) Notice: Subject to any disclaimer, the term of this patent is extended or adjusted under 35 U.S.C. 154(b) by 53 days.

(21) Appl. No.: 14/898,155

(22) PCT Filed: Jun. 10, 2014

(86) PCT No.: PCT/DE2014/100193
§ 371 (c)(1),
(2) Date: Dec. 14, 2015

(87) PCT Pub. No.: WO2014/198262
PCT Pub. Date: Dec. 18, 2014

(65) Prior Publication Data
US 2016/0149427 A1 May 26, 2016

(30) Foreign Application Priority Data
Jun. 13, 2013 (DE) .......... 10 2013 009 880

(51) Int. Cl.
*H02J 7/00* (2006.01)
*H04M 1/04* (2006.01)
*G06F 1/16* (2006.01)

(52) U.S. Cl.
CPC .......... *H02J 7/0044* (2013.01); *G06F 1/1632* (2013.01); *H02J 7/0027* (2013.01); *H04M 1/04* (2013.01)

(58) Field of Classification Search
CPC .................................. H02J 7/0044
USPC ......................................... 320/115
See application file for complete search history.

(56) References Cited

U.S. PATENT DOCUMENTS

| | | | | |
|---|---|---|---|---|
| 6,016,046 A * | 1/2000 | Kaite | ..................... | H01M 10/46 320/108 |
| 6,154,010 A * | 11/2000 | Geiger | ................. | H02J 7/0073 320/137 |
| 6,864,798 B2 * | 3/2005 | Janik | ..................... | G06F 1/1632 320/107 |
| 6,891,351 B2 * | 5/2005 | Chen | ..................... | G06F 1/1632 320/115 |
| 6,926,130 B2 * | 8/2005 | Skowronski | ........... | H02G 11/02 191/12.2 R |
| 2005/0168189 A1 * | 8/2005 | Schweigert | ............. | H02J 9/005 320/107 |
| 2007/0216352 A1 | 9/2007 | Shaddle | | |
| 2007/0260798 A1 * | 11/2007 | Griffin, Jr. | ........... | H04B 1/3822 710/303 |

(Continued)

FOREIGN PATENT DOCUMENTS

WO          03/088632 A1     10/2003

*Primary Examiner* — Yalkew Fantu
(74) *Attorney, Agent, or Firm* — James Creighton Wray; Meera P. Narasimhan

(57) ABSTRACT

A station 1 for charging and holding telecommunications devices 20, 21, 22 is equipped with a platform 2 with a multiplicity of successively arranged lengthways slots 6, 7, 8, 9 for the telecommunications devices 20, 21, 22. A free space 4 remains underneath the platform 2. Bushings 11, 12, 13 are provided in the slots 6, 7, 8, 9 for supply cables 18, 19 and/or plugs 16, 17 for the telecommunications devices 20, 21, 22.

14 Claims, 7 Drawing Sheets

(56) References Cited

U.S. PATENT DOCUMENTS

2009/0278495 A1* 11/2009 Kaye ................... H02J 7/0027
　　　　　　　　　　　　　　　　　　　　　320/114
2011/0025263 A1* 2/2011 Gilbert ................ H02J 7/0044
　　　　　　　　　　　　　　　　　　　　　320/108

* cited by examiner

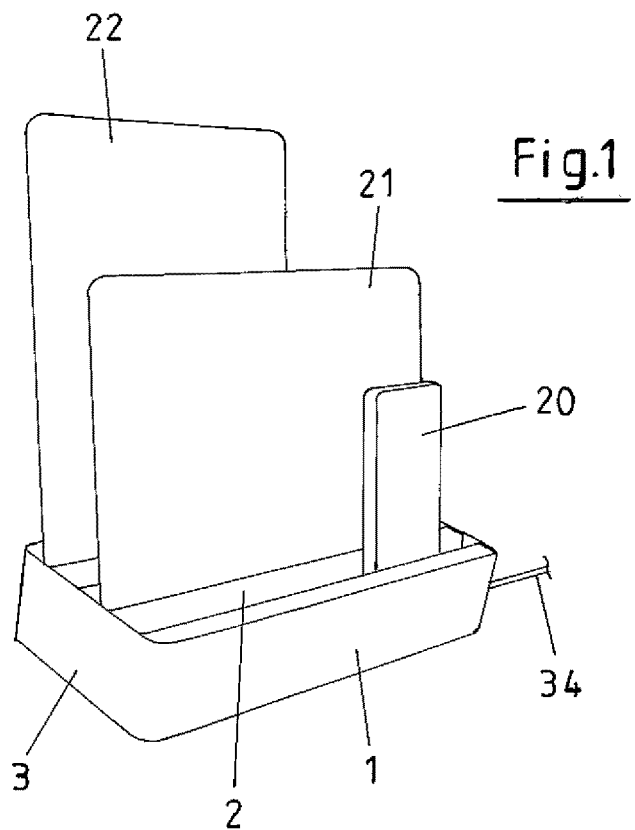
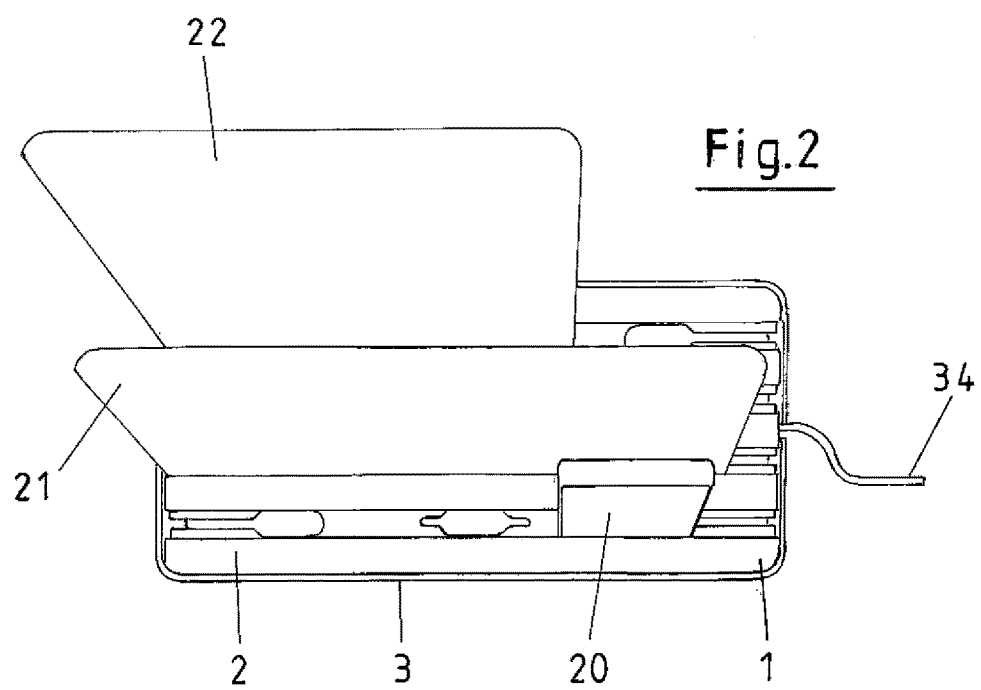

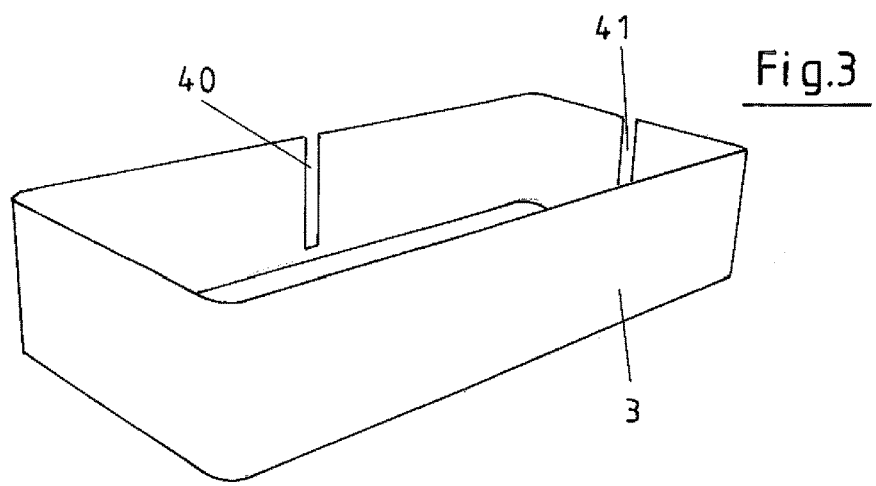
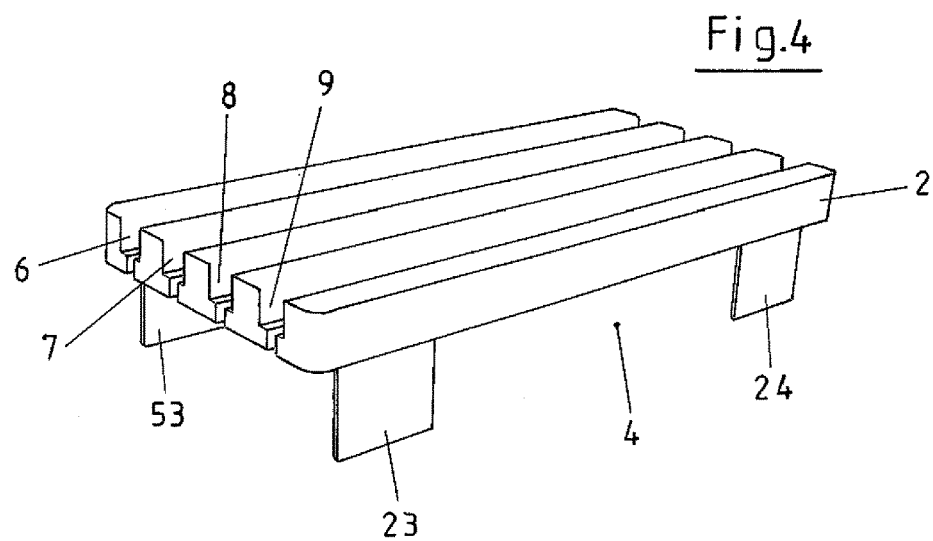
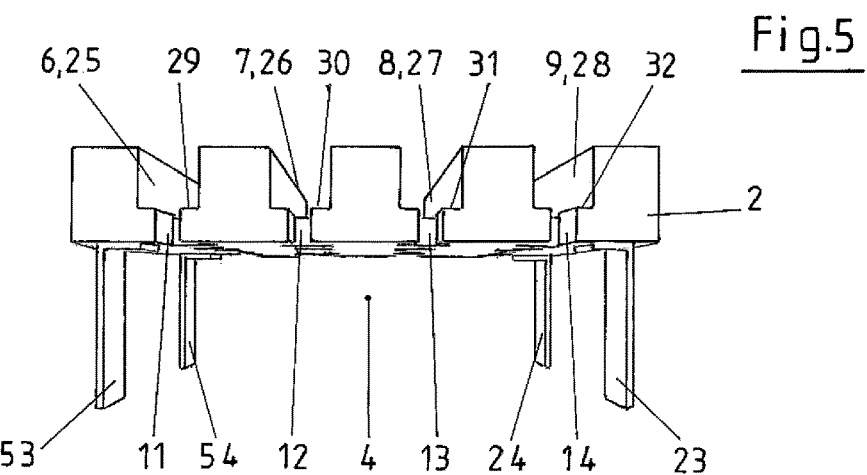

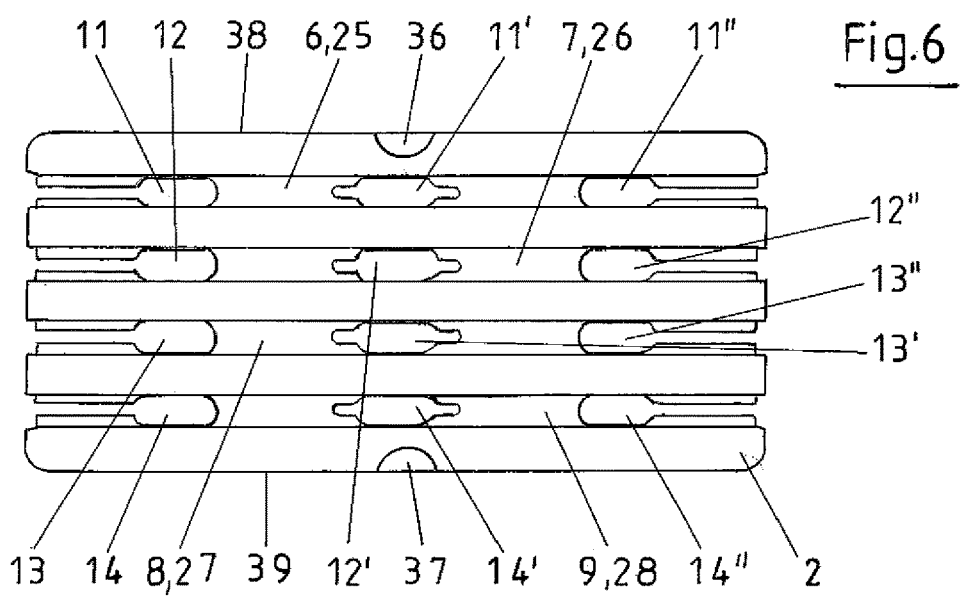
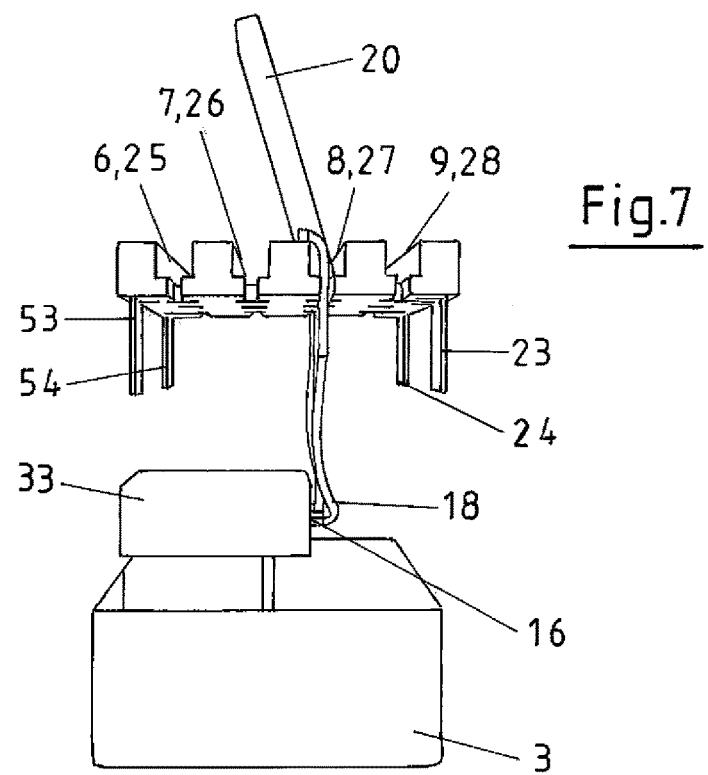

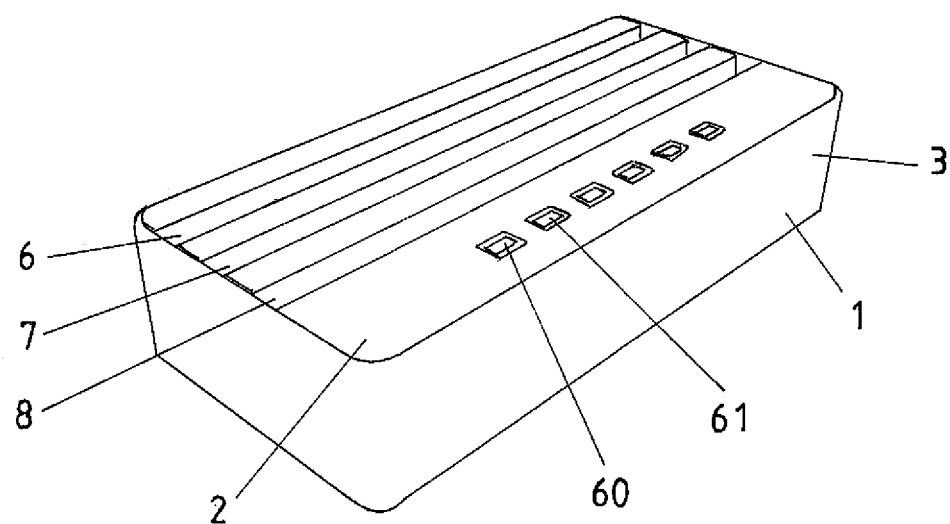
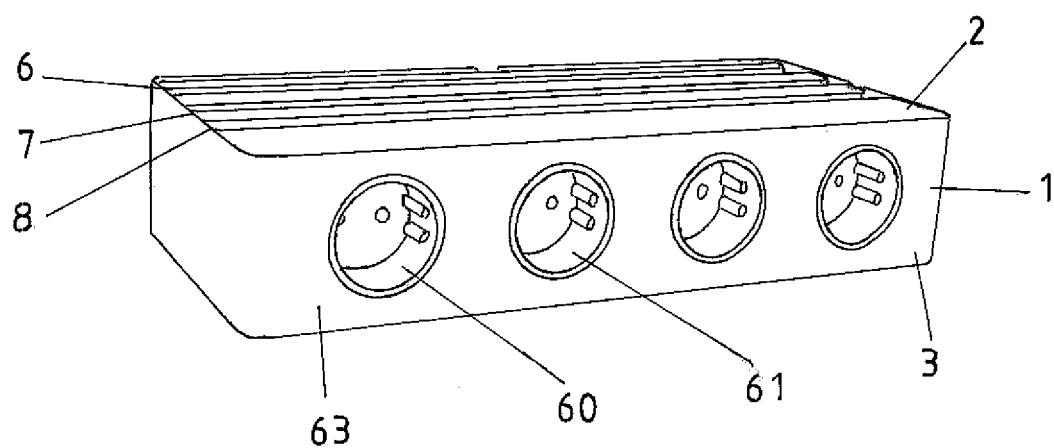

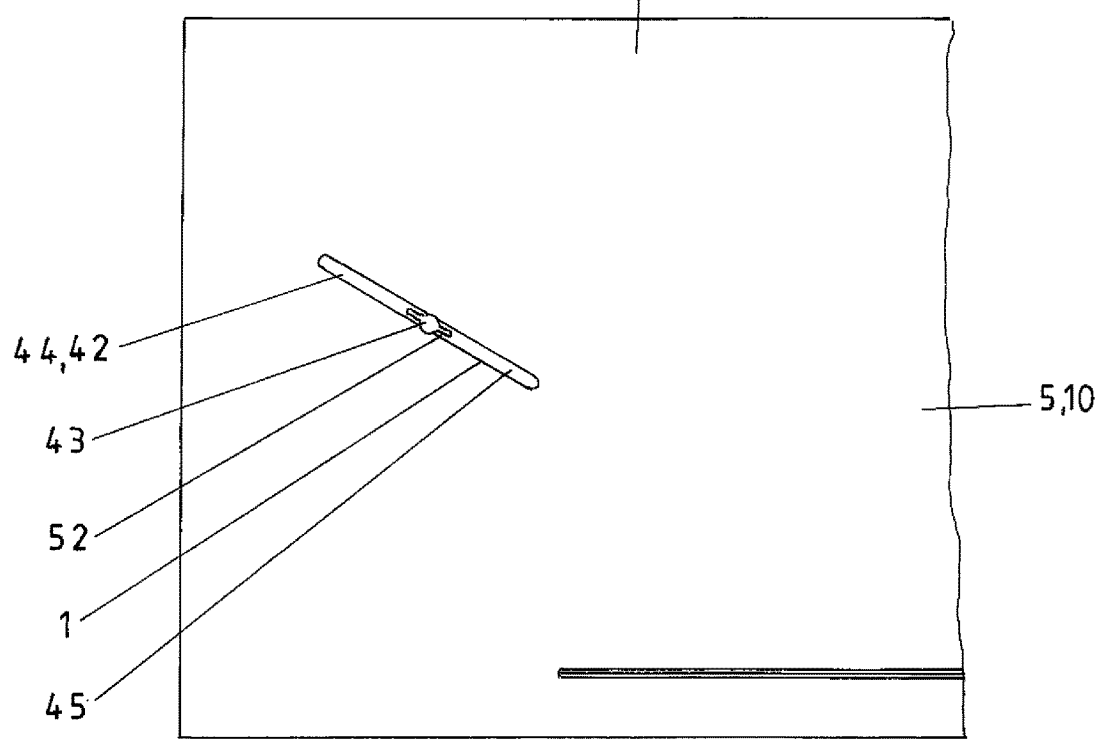
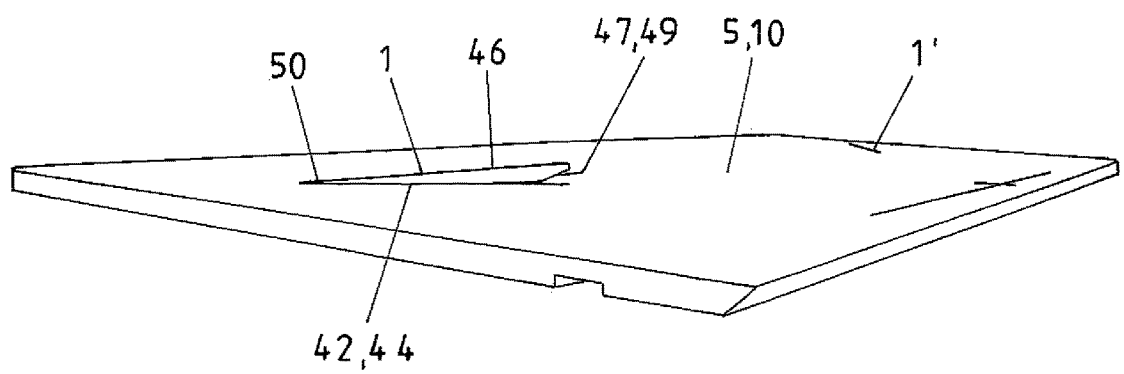

STATION FOR CHARGING AND HOLDING TELECOMMUNICATIONS DEVICES

This application claims the benefit of German Application No. 10 2013 009 880.7 filed Jun. 13, 2013, and PCT/DE2014/100193 filed Jun. 10, 2014, International Publication No. WO 2014/198262 A1, which are hereby incorporated by reference in their entirety as if fully set forth herein.

The invention concerns a station for charging and holding telecommunications devices.

Telecommunications devices such as mobile telephone or tablet computers are so popular that several of these devices can be found in many households or offices. All users know the problem of frequently misplacing devices or not finding a suitable place to charge the batteries of the devices. The latter also applies, for example, outside the home or office at a location with which a person is not very familiar, such as a hotel. Stations for holding several such mobile devices are already known, but their manageability is very restricted, because several devices, or several devices of different types cannot be held, or because these stations, because of the necessity of making a mains connection, have such a complicated construction that users keep or charge their devices separately again.

The present invention therefore gives itself the task of creating a station for charging and holding telecommunications devices that is suitable for holding several, even different, devices, and for their fast and safe connection to an electricity supply and that is easy to operate.

This task is solved in that the station is equipped with a platform with a multiplicity of successively arranged lengthwise slots each for at least one telecommunications device, whereby a free space remains underneath the platform and bushings for supply cables and/or plugs for the telecommunications devices are provided between platform and free space in the slots.

The object of the invention is therefore a station of this kind with an upper level, in which a platform is arranged that has a multiplicity of successively arranged lengthwise slots. Each of these slots is used to hold at least one telecommunications device, whereby the shape of the slots is selected so that different devices as well can be held there. A free space remains in the lower level that can be used to accommodate, for example, cables or plugs or a distribution box as well. Bushings are provided in the slots to connect the devices stored on the platform and the free space underneath this.

In order to guarantee the free space underneath the platform, it is planned for the platform to be higher, i.e. on at least two, preferably four, feet. These should be located at opposite sides of the platform or in its four corners.

It is to be regarded as particularly expedient if the platform contains recesses acting as slots for the devices whose length, width and depth are compatible with commercially available telecommunications devices. The devices are therefore inserted successively into the slots, which are shaped as recesses, whereby these are dimensioned so that different device types are held securely there and can be connected without complication to the mains supply.

A particularly direct and easy to handle connection between the devices arranged on the platform and the free space underneath is created if the bushings for the supply cables and/or plugs are provided on the underside of the slots. This means that on the underside of the slots there are openings for holding and/or passing the cable or plug through. Therefore, all the user has to do to connect the devices is insert the appropriate connector into his device and the connection is made, for example to a distributor box positioned underneath the platform for bringing the devices together.

A further embodiment of the invention is one in which a distributor box is located in the free space underneath the platform to which the telecommunications devices can be connected which can be connected to the mains supply through a common supply cable. On the one hand, the devices are connected there with their plugs; on the other hand, the distributor box is connected to the mains supply through a single supply cable. The use of a USB hub is conceivable in this context, through which the connected devices can be brought together and then supplied with electricity.

As an additional component of the station it is provided that this has a housing for holding the platform that is suitable for holding cables, connectors and the above-mentioned distributor box and encloses these units so that they practically disappear without the otherwise usual cable tangle.

If modifications are necessary for simpler operating and removing the housing and platform, it is suggested that the platform has recesses at two opposite sides for removing the platform from the housing. In this way, the platform can be held with two fingers and pulled easily out of the housing.

To enable the platform to be connected to a mains supply it is helpful if the housing has at least one opening for passing supply cables through for connection to the mains supply, which is then the only cable which the user still has to handle. In a preferred embodiment, the housing has at least one vertical slit as an opening in the centre on a lengthways and a transverse side.

In an alternative embodiment, it is provided that the housing and/or the platform have plug connectors, for example, plug connectors for mains plugs or USB cables.

The invention also concerns a station for charging and holding telecommunications devices integrated in a piece of furniture, with at least one lengthways slot integrated in a horizontal section of the piece of furniture for at least one telecommunications device, whereby a bushing for supply cables and/or plugs for the telecommunications devices is provided in the horizontal section of the piece of furniture.

In this variant of the invention, the station for charging and holding the devices is integrated in a piece of furniture, which may, for example, be a table top, a cabinet shelf, a shelf or a worktop. At least one slot in accordance with the invention is provided in a horizontal section of this kind, e.g. in a desktop. This includes bushing for cables and/or plugs, so that all the attachments of the devices disappear underneath the panel. This type of station enables good handling of the telecommunications device and in addition is very advantageous optically, because all terminal connections can be concealed and the device projects to an extent from the furniture panel.

It is not only recommended that the slot for the devices is designed as a recess whose length, width and depth are aligned to commercially available telecommunications devices, but the slot should also have recesses corresponding to several different telecommunications devices, so that several different devices can be positioned there.

It was considered in particular that the recesses are designed graduated in accordance with their dimensions, whereby smaller recesses are sunk into the bottom of the next larger recess. A first larger recess is therefore designed, e.g. in its dimensions corresponding to a table computer. A smaller "recess in the recess" is provided in the centre of this larger recess that is suitable as the slot for a mobile telephone and is designed as such.

An advantageous implementation of the invention provides in addition that the bushing for the supply cables and/or plugs is provided in the bottom of the slot so that, as mentioned above, the cables and plugs can disappear underneath the piece of furniture or section thereof, for example underneath a table top.

It is expedient in the first place for optical reasons if the piece of furniture is fitted with an insert designed to correspond with the slot. If a device is not in use or being charged at the moment, an insert can be placed in the slot whose dimensions correspond to those of the recess and is expediently flush with the upper edge of the furniture panel.

The insert can be removed easily from the recess through a type of rocker construction. For this purpose, it is proposed that the insert has a bevel at least one end on the underneath. For this purpose, the insert must be pressed down slightly at one end and the insert can be gripped at the other end, where it projects slightly from the panel thanks to the rocker construction, and then be removed from the recess.

The invention is characterised in particular in that a station is created that is suitable equally for holding and charging different types of telecommunications devices. The station comprises a platform with several lengthways slots positioned one after the other that are designed so that they can hold, for example, either mobile telephones or tablet computers. The devices can be docked in the station's slots with their terminal connections, which are usually located on the lengthways or transverse sides. On their underside, the slots have a bushing for cables or plugs in the free space underneath the platform, where cables, terminal connections or distributors for different devices can be brought together. The station is then supplied centrally with electricity through a joint external connection in the form of a cable with a power connection or a USB hub. It is also conceivable to integrate the station in accordance with the invention into a piece of furniture, above all into a table top or worktop. The cable and connectors are led underneath the panel through a bushing provided in the slot and thus disappear elegantly.

BRIEF DESCRIPTION OF THE DRAWINGS

Further details and advantages of the object of the invention can be taken from the following description and the associated drawing, in which an implementation example with the necessary details and individual parts is shown.

FIG. 1 Shows a perspective view of a station with three devices,

FIG. 2 Shows a top view of the station,

FIG. 3 Shows a housing,

FIG. 4 Shows a perspective view of a platform,

FIG. 5 Shows a face view of a platform,

FIG. 6 Shows a top view of a platform,

FIG. 7 Shows the connection between platform and distributor box as an exploded drawing, FIG. 8 Shows a perspective view of the representation in FIG. 7, FIG. 9 Shows a variant of FIG. 8, FIG. 10 Shows a station with external terminal connections, FIG. 11 Shows a variant of FIG. 10, FIG. 12 Shows a top view of a table top with station, FIG. 13 Shows a perspective view of a table top with station, FIG. 14 Shows an insert in der slot and FIG. 15 Shows an insert being withdrawn from the slot.

DETAILED DESCRIPTION

Figure 8:
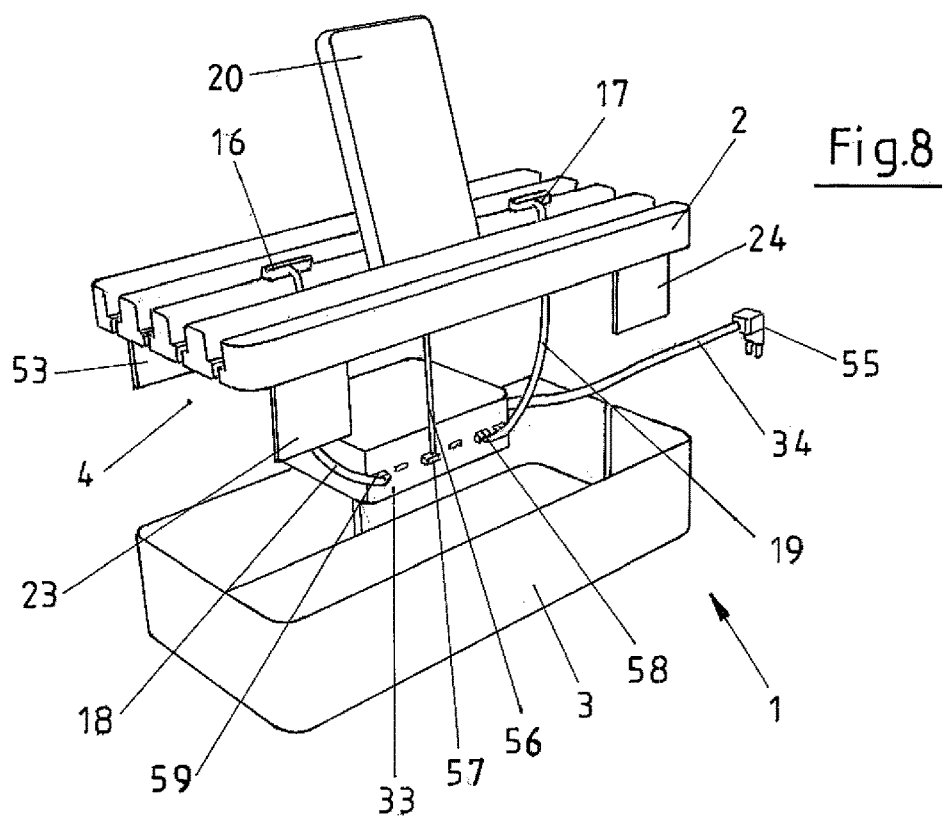

FIG. 1 shows a station 1 with the central components housing 3 and platform 2. It can be seen clearly that the terminal connections for the three telecommunications devices 20, 21 and 22 that are held and, where necessary, are to be charged here disappear completely in the station 1. Only one central supply cable 34 serves as the connection to a mains supply.

The situation is made clear in FIG. 2 as well with the mobile telephone 20 and the two tablet computers 21 and 22.

FIG. 3 shows a housing 3 without a platform with the two openings 40 and 41 designed as vertical slits for the bushing of the cables not shown here from the housing 3 or from the station to the power supply.

The component shown in FIG. 4 is inserted in the housing in accordance with FIG. 3. This is platform 2 with four feet, of which the three marked 23, 24 and 53 can be seen here at the four corners underneath platform 2. This forms a free space 4 that can be used to accommodate extremely different power units. Platform 2 has four lengthways slots marked here with 6, 7, 8 and 9 for the communication devices that are not shown here.

FIG. 5 illustrates above all the view into slots 6, 7, 8 and 9 in platform 2 designed as recesses 25-28 and in addition corresponding to commercially available communication devices with the bushings 11-14 for cables and/or plug-in connectors at the respective undersides 29-32 of slots 6-9. What is also clearly identifiable in the illustration in accordance with FIG. 5 is the large free space 4, which is created because platform 2 is supported on feet 23, 24, 53, 54.

In the top view FIG. 6 shows platform 2 with its different slots. Four lengthways slots 6-9 positioned behind each other each comprise three bushings 11-14, correspondingly designed and assigned to commercially available communication devices in recesses 25-28. Recesses 36, 37, into which, e.g., a thumb and forefinger can be inserted to remove platform 2 easily from the housing, are located at the two sides 38, 39 of platform 2.

An exploded drawing in accordance with FIG. 7 shows, on the one hand, the telecommunications device, here the mobile telephone 20 inserted into platform 2, or more exactly into slot 8 designed as recess 27 and, on the other hand, the inner workings of housing 3 in the form of the distributor box 33. The connection between the mobile telephone 20 and the box 33 for the purpose of charging the former is made through plug 16 or cable 18.

FIG. 8 shows similar with the plugs 16, 17, which, to make the simplicity of this mechanism clear, project from platform 2 as additional connection facilities and can be connected to box 33 via cables 18, 19 and plugs 58, 59. There is already a connection through plug 57 and cable 56 to the mobile telephone 20. From the distributor box 33 a supply cable 34 leads from the station 1 and can then be connected via the plug 55 and a mains supply.

Figure 9:
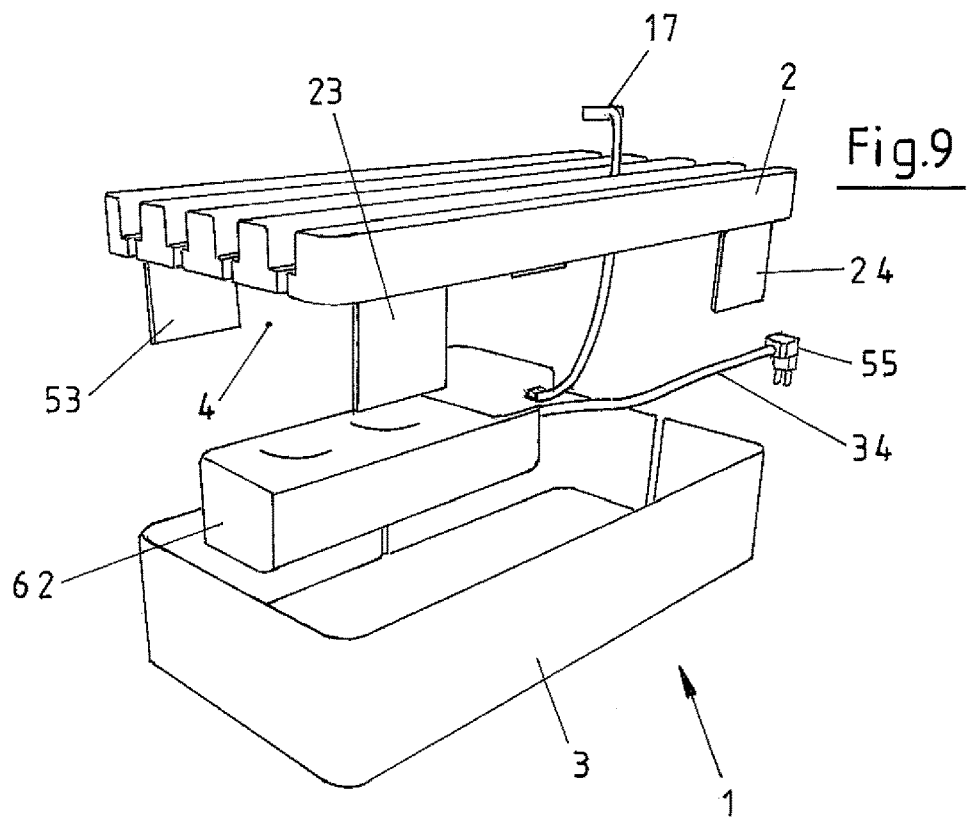

A variant to the station in FIG. 8 is shown in the station in accordance with FIG. 9, namely a multiple plug 62, to which the devices not shown here can be connected with plugs and charged there, in that there is a connection to the plug 55 via the supply cable 34 for the external terminal connection.

A further alternative for the design of station 1 is illustrated in FIG. 10. Terminal connections on platform 2 marked as examples with 60 and 61 are used to connect USB connectors, in order to establish a connection with the inner workings of station 1, which are not shown here. The number of terminal connections 60, 61 can of course be varied as needed. In doing this, each terminal connection 60, 61 etc. is assigned to a slot 6, 7 etc., which can be illustrated where necessary by markings.

The same applies to station 1 in the representation in accordance with FIG. 11 and the terminal connections 60, 61 for connector, positioned here in the front side 63.

The variant of the invention in which a slot 42 is integrated in a piece of furniture is shown in FIGS. 12-15. First of all, FIG. 12 shows a view of a piece of furniture 5 in the form of a desk top or worktop. Slot 42 is arranged here at a slant, so that the screen of a telecommunications device that is not shown here can be clearly seen by the user under ergonomic aspects as well and the device is easy to operate. Slot 42 is designed as a recess 44, whereby a "recess 52 in recess 44" is located in the middle of the bottom 45 of slot 42. Whereas the larger, flatter recess 44 is designed correspondingly to a tablet computer, the smaller, deeper recess 52 serves as a slot for a mobile telephone. The bushing 43 is central and positioned so that the supply cables for all device variants disappear directly under the panel 10.

FIG. 13 shows a perspective view of a desktop or worktop with two stations 1 and 1' and an insert 46 in slot 42 that projects slightly at its end 49, where this also lets a bevel 47 be seen, after the insert 46 was pushed down slightly at the opposite end 50 to actuate this rocker construction.

Figure 14:
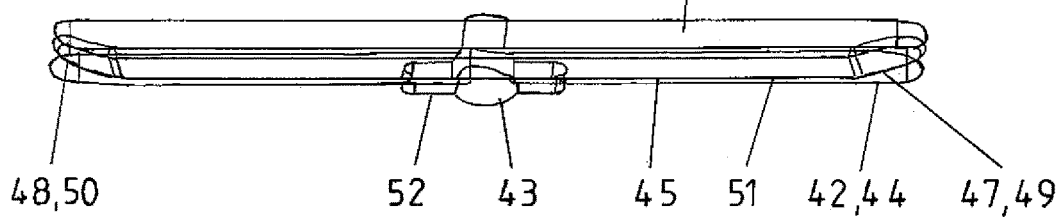

FIG. 14 illustrates an insert 46 in the slot 42 or the recess 44, which are shown here without a piece of furniture and telecommunications devices. What is illustrated above all is the rocker construction of the insert 6 at its two ends 49 and 50 with the bevels 47, 48 provided at the underside 51 of the insert 46. The bushing 43 is located centrally in the slot 42, and next to it the recess 52 designed correspondingly for a comparatively small mobile telephone as its slot.

Figure 15:
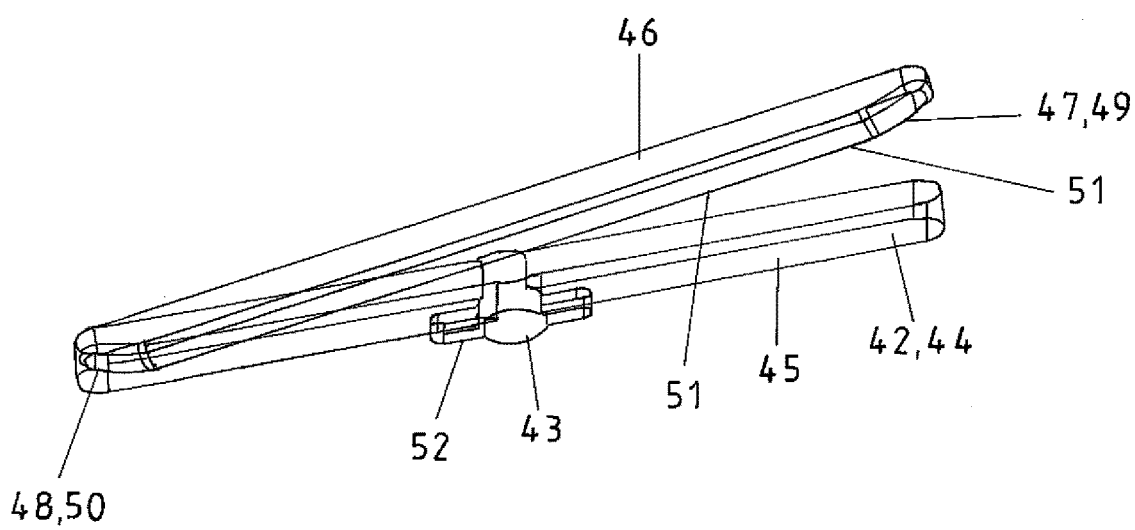

Through application of force in the area of the bevel 48 at the end 50 of the insert 16 the latter is brought into the position shown in FIG. 15. The insert 16 can now be removed easily in the area of its opposite end 49 from the slot 42 or the recess 44.

The invention claimed is:

1. A station (1) for charging and holding telecommunications devices (20, 21, 22), with a platform (2) with a multiplicity of differently shaped lengthways slots (6, 7, 8, 9) arranged one after the other each for at least one telecommunications device (20, 21, 22), wherein the slots are recess and wherein the recesses (44, 52) are staggered in accordance with their dimensions, whereby smaller recesses (52) are in the bottoms (60) of the next larger recesses (44), and whereby a free space (4) remains underneath the platform (2) and bushings (11, 12, 13) for supply cables (18, 19) and/or plugs (16, 17) for the telecommunications devices (20, 21, 22) are provided in the slots (6, 7, 8, 9) between the platform (2) and the free space (4).

2. The station in accordance with claim 1, wherein the platform (2) is supported on at least two feet (23, 24).

3. The station in accordance with claim 1, wherein the platform (2) has recesses (25, 26, 27, 28) serving as slots (6, 7, 8, 9) for the devices (20, 21, 22), whose length, width and depth are coordinated to commercially available telecommunications devices (20, 21, 22).

4. The station in accordance with claim 1, wherein the bushings (11, 12, 13) for the supply cables (18, 19) and/or plugs (16, 17) are provided on the underside (29, 30, 31, 32) of the slots (6, 7, 8, 9).

5. The station in accordance with claim 1, wherein a distributor box (33) is located in the free space (4) underneath the platform (2) to which the telecommunications devices (20, 21, 22) can be connected and which can be connected to the mains supply through a common supply cable (34).

6. The station in accordance with claim 1, wherein the station (1) has a housing (3) to hold the platform (2).

7. The station in accordance with claim 6, wherein the platform (2) has recesses (36, 37) on two opposite sides (38, 39) for removing the platform (2) from the housing (3).

8. The station in accordance with claim 6, wherein the housing (3) has at least one opening (40, 41) for the bushing for supply cables (34) to the connection with the mains supply.

9. The station in accordance with claim 1, wherein the housing (3) and/or the platform (2) has connectors (60, 61).

10. A station (1) for charging and holding telecommunications devices (20, 21, 22) integrated into a piece of furniture (5), with at least one lengthways slot (42) having differently shaped recesses for, in each case, at least one telecommunications device (20, 21, 22) integrated into a horizontal section (10) of the piece of furniture (5), wherein the slots are recess and wherein the recesses (44, 52) are staggered in accordance with their dimensions, whereby smaller recesses (52) are in the bottoms (60) of the next larger recesses (44), and whereby a bushing (43) for supply cables (18, 19) and/or plugs (16, 17) for the telecommunications devices (20, 21, 22) is provided in the horizontal section (10) of the piece of furniture (5).

11. The station in accordance with claim 10, wherein the slot (42) has several recesses (44, 52) designed corresponding to different telecommunications devices (20, 21, 22).

12. The station in accordance with claim 10, wherein the bushing (43) for the supply cables (18, 19) and/or plugs (16, 17) is provided in the bottom (45) of the slot (42).

13. The station in accordance with claim 10, wherein the piece of furniture (5) is equipped with an insert (46) designed correspondingly to the slot (42).

14. The station in accordance with claim 13, wherein the insert (46) has a bevel (47, 48) at least one end (49, 50) on its underside (51).

* * * * *